United States Patent
Vau

(10) Patent No.: US 9,654,691 B2
(45) Date of Patent: May 16, 2017

(54) SYSTEM FOR STABILIZING A POSITIONER WITH MOTORIZED AXES OF AN ITEM OF EQUIPMENT, METHOD AND APPLICATION

(75) Inventor: Bernard Vau, Saint Maur des Fosses (FR)

(73) Assignee: IXBLUE, Marly le Roi (FR)

(*) Notice: Subject to any disclaimer, the term of this patent is extended or adjusted under 35 U.S.C. 154(b) by 715 days.

(21) Appl. No.: 14/111,225

(22) PCT Filed: Apr. 11, 2012

(86) PCT No.: PCT/FR2012/050782
§ 371 (c)(1),
(2), (4) Date: Oct. 11, 2013

(87) PCT Pub. No.: WO2012/140359
PCT Pub. Date: Oct. 18, 2012

(65) Prior Publication Data
US 2014/0036083 A1   Feb. 6, 2014

(30) Foreign Application Priority Data

Apr. 12, 2011 (FR) ...................... 11 53166

(51) Int. Cl.
H04N 7/18      (2006.01)
H04N 5/232     (2006.01)
(Continued)

(52) U.S. Cl.
CPC .......... H04N 5/2328 (2013.01); B60R 1/00 (2013.01); G01B 11/022 (2013.01);
(Continued)

(58) Field of Classification Search
CPC ........ H04N 5/2328; H04N 7/181; B60R 1/00; G01B 11/022; G01C 11/025
See application file for complete search history.

(56) References Cited

U.S. PATENT DOCUMENTS 4,621,332 A * 11/1986 Sugimoto ............ B25J 13/085
                                              318/568.17
6,140,787 A * 10/2000 Lokhorst ............... E02F 3/435
                                              318/568.18
(Continued)

FOREIGN PATENT DOCUMENTS

EP   0 878 686        11/1998
GB   2 345 155         6/2000
GB   2 345 155 B  *    6/2000   ............. G02B 27/64

OTHER PUBLICATIONS

Anonymous: "Super-G Gyro-Stabilized Aerial Camera System"; Nettmann Systems International; Jan. 28, 2011; XP002659993.*
(Continued)

Primary Examiner — Shawn An
(74) Attorney, Agent, or Firm — Young & Thompson

(57) ABSTRACT

System for stabilizing a positioner of an equipment item, the positioner being oriented via an orientation command, and installed on a vehicle undergoing motions, the positioner including angular coders producing angular measurements and a set of gyrometric sensors producing measurements of rates of instantaneous rotation, and exhibiting biases, the positioner including a calculation unit with elements of intra-positioner slaving-correction of the instantaneous rates of rotation of the item using measurements and the orientation command to stabilize the item following the line of sight. The vehicle includes an element for measuring the attitude of the vehicle giving vehicle attitude measurements. The system includes calculation elements for controlling the positioner according to a control law to correct the biases by virtue of the vehicle attitude information and by implementing a state observer combining an estimation of attitude of an item and the measurements of rates of rotation of an item of equipment.

13 Claims, 4 Drawing Sheets

(51) Int. Cl.
    *G01B 11/02*    (2006.01)
    *B60R 1/00*     (2006.01)
    *G02B 27/64*    (2006.01)
    *G01C 11/02*    (2006.01)

(52) U.S. Cl.
    CPC .......... *G02B 27/644* (2013.01); *H04N 7/181* (2013.01); *G01C 11/025* (2013.01)

(56) References Cited

U.S. PATENT DOCUMENTS

| | | | |
|---|---|---|---|
| 6,396,235 B1 | 5/2002 | Ellington et al. | |
| 6,455,830 B1* | 9/2002 | Whalen | G01C 11/025 250/203.1 |
| 6,495,820 B1* | 12/2002 | Cooper | G01D 5/30 180/282 |
| 8,265,804 B1* | 9/2012 | Uetrecht | B64G 1/361 701/13 |
| 2009/0058345 A1* | 3/2009 | Cooper | G05B 19/21 318/602 |

OTHER PUBLICATIONS

Anonymous: "Super-G Gyro-Stabilized Aerial Camera System"; Nettmann Systems International; Jan. 28, 2011 XP002659993.*
International Search Report dated Aug. 13, 2012, corresponding to PCT/FR2012/050782.
Matthew W. Ryan, et al.; "MEMS based AHRS with Adaptive Bias Estimation for High Performance Rate Sensor Replacement"; Position Location and Navigation Symposium (Plans), 2010 IEEE/ION; May 4, 2010; pp. 214-220.

* cited by examiner

SYSTEM FOR STABILIZING A POSITIONER WITH MOTORIZED AXES OF AN ITEM OF EQUIPMENT, METHOD AND APPLICATION

The present invention relates to a system for gyroscopic stabilization of a motorized-axis positioner of an equipment, as well as a corresponding method and the application thereof. It provides for example the stabilization of imaging devices on board vehicles subjected to movements. It is therefore adapted to the gyro-stabilization of positioners provided with at least two axes, sometimes referred to as Pan and Tilt turret positioners.

BACKGROUND OF THE INVENTION

The Pan and Tilt turrets are servo-controlled positioners provided with to motorized axes, the external axis (or pan axis) being generally an azimuth axis (i.e. a vertical axis when the turret is positioned on an horizontal support), the second axis (or tilt axis) is an elevation axis.

Such turrets are installed on a vehicle, that may be in particular a boat or a plane, but also a terrestrial vehicle. This type of vehicle is liable to perform translational and rotational movements according to the 6 degrees of freedom. In the following of the document, these movements of the vehicle will be qualified as bearing movements. The axes of the turret are motorized. The turret is fixed at its base to the vehicle.

On the internal axis of the turret (tilt axis) is fixed an equipment that may be, for example, a receiver system, or possibly emitter-receiver system, that may notably be of optical or electromagnetic type. This system may be, in particular, a camera or an antenna.

The role of these positioners is to compensate for the bearing movements of the vehicle in such a manner that the line of sight or pointing of the equipment, notably camera or antenna, remains fixed with respect to a local terrestrial reference system. These positioners may be equipped with gyroscopic stabilization means of their own, which will be qualified hereinafter as "intra-positioner".

Two mains intra-positioner stabilization/servo control-correction methods are known, which are presented now with reference to FIGS. 4 and 5.

It is also known by the document GB2345155A a means for gyro-stabilization of an imager, implementing a Kalman filter. However, the data that are processed in the filter after integration of the measurements of the gyrometers are (angular) position data and, furthermore, corrections are performed on these data before their processing through the Kalman filter. Finally, it is indicated that an additional correction means has to be implemented to obtain a better stabilization.

In order to make easier the following explanations, a number of notations are shown:

$\mathcal{R}_0$ local terrestrial reference system (north, east, down)
$\mathcal{R}_1$ reference system associated with the vehicle
$\mathcal{R}_2$ reference system associated with the turret support
$\mathcal{R}_3$ reference system associated with the platform supporting the camera
$\psi$ yaw of the vehicle provided by the attitude unit of the vehicle
$\theta$ pitch of the vehicle provided by the attitude unit of the vehicle
$\phi$ roll of the vehicle provided by the attitude unit of the vehicle
$R_{10}$ transfer matrix from the reference system $\mathcal{R}$ to the reference system $\mathcal{R}$.

With:

$$R_{10} = \begin{pmatrix} 1 & 0 & 0 \\ 0 & \cos\phi & \sin\phi \\ 0 & -\sin\phi & \cos\phi \end{pmatrix} \cdot \begin{pmatrix} \cos\theta & 0 & -\sin\theta \\ 0 & 1 & 0 \\ \sin\theta & 0 & \cos\theta \end{pmatrix} \cdot \begin{pmatrix} \cos\psi & \sin\psi & 0 \\ -\sin\psi & \cos\psi & 0 \\ 0 & 0 & 1 \end{pmatrix} \quad (1)$$

The vehicle is supposed to be equipped with an attitude unit, so the matrix $R_{10}$ is known.
$\theta_P$ angular position of the pan axis of the positioner (axis 1)
$\theta_T$ angular position of the tilt axis of the positioner (axis 2)
$\dot{\theta}_P$ angular rate of the pan axis (axis 1)
$\dot{\theta}_T$ angular rate of the tilt axis (axis 2)
$R_{32}$ transfer matrix from the reference system 2 to the reference system 3 (transfer from the turret support to the camera support).
with:

$$R_{32} = \begin{pmatrix} \cos\theta_T & 0 & -\sin\theta_T \\ 0 & 1 & 0 \\ \sin\theta_T & 0 & \cos\theta_T \end{pmatrix} \cdot \begin{pmatrix} \cos\theta_P & \sin\theta_P & 0 \\ -\sin\theta_P & \cos\theta_P & 0 \\ 0 & 0 & 1 \end{pmatrix} \quad (2)$$

$R_{21}$ Transfer matrix from the reference system 1 (reference system of the vehicle) to the reference system 2 (reference system of the turret support).
It is supposed, as a simplification, that $R_{21} \approx I_3$ (the turret support has been aligned to the reference system of the vehicle after a calibration process).
Let's note that: $R_{ij} = R_{ji}^T$
$\omega_x$ instantaneous rate of rotation of the camera support about the axis x
$\omega_y$ instantaneous rate of rotation of the camera support about the axis y
$\omega_z$ instantaneous rate of rotation of the camera support about the axis z
The structural scheme of the positioner with its camera is shown in FIG. 2.
$R_{30}$ transfer matrix from the local terrestrial reference system to the reference system of the camera support.
with:

$R_{30} = R_{32} \cdot R_{21} \cdot R_{10}$ $R_{30} \approx R_{32} \cdot R_{10}$ \quad (3)

q quaternion of the attitude of the camera support with respect to the terrestrial reference system.
Let's consider:

$$q = \begin{pmatrix} a \\ b \\ c \\ d \end{pmatrix}$$

a, b, c, d components of the quaternion. The attitude quaternion is normalized: $a_2 + b^2 + c^2 + d^2 = 1$
$R_{30}$ may be expressed as a function of $\psi$, $\theta$, $\phi$, $\theta_P$, $\theta_T$, but may also be expressed based on the components of q, i.e.:

$$R_{03} = \begin{pmatrix} a^2 + b^2 - c^2 - d^2 & 2(bc - ad) & 2(bd + ac) \\ 2(bc + ad) & a^2 - b^2 + c^2 - d^2 & 2(cd - ab) \\ 2(bd - ac) & 2(cd + ab) & a^2 - b^2 - c^2 + d^2 \end{pmatrix} \quad (4)$$

with: $R_{03} = R_{30}^T$ \quad (5)

The pointing vector (line of sight of the camera) is the vector X of the reference system $\mathcal{R}$. This pointing vector (unitary vector) may be expressed with respect to the local terrestrial reference system by means of an azimuth and elevation component.

$\theta_{az}$ azimuth angle of the pointing vector,
$\theta_{el}$ elevation angle of the pointing vector.

FIG. 3 gives a diagram showing the relations between the terrestrial reference system and the pointing vector.

Through handling of the transfer matrices, the following relation is shown:

$$\begin{pmatrix} \cos\theta_{el} \cdot \cos\theta_{az} \\ \cos\theta_{el} \cdot \sin\theta_{az} \\ -\sin\theta_{el} \end{pmatrix} = R_{03} \cdot \begin{pmatrix} 1 \\ 0 \\ 0 \end{pmatrix} \quad (6)$$

After these annotations, the known techniques of stabilization will be described.

The objective of the gyro-stabilization is to keep constant the line of sight of the equipment carried by the positioner with respect to the terrestrial reference system, despite the bearing movements of the vehicle.

That is to say that it is searched to keep constant the azimuth and the elevation of the pointing vector: $\theta_{ax}$ and $\theta_{el}$.

The pan and tilt axes of the turret are controlled by electric motors, generally DC brushless motors whose torque is proportional to the current command they receive. These motors/axes generally have angle encoders that allow knowing the angular position of the controlled axes.

The state of the art essentially includes two methods of stabilization.

The first method shown in FIG. 4 consists in making, on each of the pan and tilt axes, angular position servo controls, the controlled axes including angle encoders.

Let's call:
$\theta_P^*$ the command on the pan axis,
$\theta_T^*$ the command on the tilt axis,
$\theta_{az}^*$ the command of the pointing vector azimuth,
$\theta_{el}^*$ the command of the pointing vector elevation,
the control law consists in calculating $\theta_P^*$ and $\theta_T^*$ from the commands $\theta_{az}^*$ and $\theta_{el}^*$, the matrix $R_{10}$ being known because given by the attitude unit of the vehicle.

The (single-variable) servo control of the pan and tilt axes presents no difficulty and the structure of the control law is shown in FIG. 4.

This first method is simple to implement but results in a rather poor quality of stabilization for several reasons:

The hypothesis has been made that $R_{21}=I_3$, resulting from a process of alignment of the turret support with respect to the reference system of the vehicle. This alignment is never perfect and there results therefrom a deteriorated pointing stability.

The physical link between the attitude unit and the positioner is not necessarily rigid or stable because the positioner may be installed at a rather great distance from the attitude unit (10 m, for example), on a support (for example, a post) that is a little flexible with respect to the reference system of the vehicle and the link variations cause a deterioration of the correction.

The "bandwidth" of the unit is generally rather small: the disturbing movements whose frequency is higher than a few Hertz are not perceived by the unit, and a fortiori are not corrected.

The dynamics of command tracking of the position servo controls may also be an obstacle if it is too low.

To try to remedy these drawbacks, it has been proposed to install the attitude unit on the positioner's base and to use the information coming from the latter to calculate the position commands for the Pan and Tilt axes. This variant gives better results because the bearing movements affecting the positioner are directly measured. It has a major drawback, which is of economic nature: the over-cost generated by the unit may then be very high.

The second method shown in FIG. 5 consists in implementing a local, intra-positioner correction, at the positioner. For that purpose, two gyrometers are placed on the axes Z and Y of the camera support (located the closest to the latter) in order to measure the instantaneous rates of rotation $\omega_y$, $\omega_z$.

Two rate servo controls are then performed in order to maintain the rate commands $\omega_y^*$, $\omega_z^*$ such that $\omega_y^*=0$, $\omega_z^*=0$.

In the particular case where the support of the positioner is in fixed position on the vehicle:

$$\begin{pmatrix} \omega_y \\ \omega_z \end{pmatrix} = \begin{pmatrix} 1 & 0 \\ 0 & \cos\theta_T \end{pmatrix} \cdot \begin{pmatrix} \dot\theta_T \\ \dot\theta_P \end{pmatrix} \quad (7)$$

$$\begin{pmatrix} \omega_y \\ \omega_z \end{pmatrix} = J \cdot \begin{pmatrix} \dot\theta_T \\ \dot\theta_P \end{pmatrix}$$

where J is the Jacobian matrix of the positioner, which is singular for:

$$\theta_T = \pm\frac{\pi}{2}$$

The corresponding control law is shown in FIG. 5, where Cp and Ct are the rate correctors on the pan and tilt axes, respectively. The correctors Cp and Ct may be synthesized according to methods that are known in the field, whether they are conventional (PID: "Proportional Integral Derivative"), or more sophisticated, in particular (LQG (Linear Quadratic Gaussian control) H∞ (Hinfinite) or pole placement) and that will not be detained herein.

This second method has the interest to regulate the rates at the closest of the camera: It results therefrom a better quality of the image stabilization. It also allows rejecting disturbances at far higher frequencies than in the first method. It is thus, from this point of view, preferable to the first method.

However, this second method has a major drawback because the gyrometers have a bias, constant in first approximation, which causes a drift on $\theta_{az}$ and $\theta_{el}$ and thus on the pointing when the rate servo controls are operational.

The performances of the second method thus strongly depend on the quality of the gyrometers used. But, the more the bias of the gyrometers is reduced, the more their bulk is great, and their cost is high. By way of example, the following table gives the over-cost for three gyrometers as a function of the bias level.

| BIAS GYRO (°/s) | COST (dihedral) (€) |
|---|---|
| 10°/s | 15€ |
| 1°/s | 150€ |
| 0.1°/s | 1500€ |

It is desirable to implement means that allow a stabilization of the positioner of quality for a reduced cost. But in some cases, the vehicle may originally include an attitude unit giving measurements of attitude of the vehicle and the use of these measurements could also be contemplated for improving the stabilization of the own, intra-positioner, means of stabilization of the positioner. In other cases, the vehicle does not include originally an attitude unit and the use of measurements of attitude of the vehicle requires the installation of an attitude unit on the vehicle, whose cost may still be far higher for precise measurements.

SUMMARY OF THE INVENTION

The invention proposes to use measurements of attitude of the vehicle obtained by an attitude unit of the vehicle, or more generally, by a means for measuring the vehicle attitude, whose quality of measurement does not need to be high, to improve the performances of own, intra-positioner, means of stabilization of a positioner and this, with gyrometer sensors of the positioner whose quality of measurement does not need to be high. It results therefrom that low-cost measuring means can be used both for the equipment positioner and for the attitude unit of the vehicle, in particular when it is added to the vehicle.

The present invention proposes a sophisticated gyroscopic stabilization system for an equipment positioner, which takes advantage of an attitude unit of the vehicle, whether it is original or added for the purpose in hand, and improves the performances of stabilization, in particular those of own, intra-positioner, means of stabilization of the positioner.

The invention thus relates to a stabilization system for an equipment positioner with motorized axes, the positioner being oriented under the action of a command of orientation following a line of sight/pointing, said positioner being installed on a vehicle, the vehicle undergoing movements referred to as bearing movements, the positioner including angle encoders producing angle measurements ($\theta_p$, $\theta_t$) for its controlled axes and a set of gyrometer sensors producing measurements of equipment instantaneous rates of rotation ($m_y$, $m_z$), said gyrometer sensors exhibiting biases ($p_y$, $p_z$), the positioner including gyrometer sensors for at least two axes (y) (z) of the equipment reference system, the positioner including a calculation unit with intra-positioner means for servo control-correction of the instantaneous rates of rotation of the equipment using measurements and the command of orientation for stabilizing the equipment following the line of sight, the system including, installed in the vehicle, a means for measuring the vehicle attitude, giving measurements of attitude of the vehicle.

According to the invention, the system includes calculation means for controlling the positioner according to a control law that allows correcting the bias ($\hat{p}_y$, $\hat{p}_z$) thanks to vehicle attitude information and by implementing a state observer combining an equipment attitude estimation ($\bar{q}$) and the measurements of equipment rates of rotation ($m_y$, $m_z$) so as to determine the biases of the gyrometer sensors of the positioner and to correct them within the control law, the equipment attitude estimation ($\bar{q}$) being obtained by calculation in the calculation means of the system, based on the vehicle attitude measurements ($\Psi$, $\theta$, $\Phi$) and the angle measurements ($\theta_p$, $\theta_t$) of the controlled positioning axes of the positioner.

In various embodiments of the invention, the following means, which can be used alone or according to any technically possible combination, are used:

the vehicle includes a means for measuring the vehicle attitude, which is an attitude unit, the vehicle is pre-equipped with an attitude unit or, more generally, with a means for measuring the vehicle attitude, the vehicle being not pre-equipped, an attitude unit or, more generally, a means for measuring the vehicle attitude, is installed, the unit or, more generally, the means for measuring the vehicle attitude is installed in the vicinity of the base of the positioner fixed to the vehicle, the unit or, more generally, the means for measuring the vehicle attitude is low cost, with an angular accuracy that may be of the order of one degree, the unit or, more generally, the means for measuring the vehicle attitude is remote from the base of the positioner, the unit or, more generally, the means for measuring the vehicle attitude is at the base of the positioner, the command of orientation is a command of instantaneous rate of rotation, the angle encoders are specific sensors giving angle measurements, the positioner includes two gyrometer sensors about the axes y and z of the reference system of the equipment to be stabilized, in particular a camera or another equipment, the positioner includes two motorized controlled axes, which are following the pan (p)/horizontal (y) and the tilt (t)/vertical (z) axes, the intra-positioner servo control-correction means of the calculation unit are based on a corrector ($C_t$, $C_p$) of instantaneous rate of rotation d on each of said at least two axes of the equipment to be stabilized, in particular camera or other equipment, the intra-positioner servo control-correction means of the calculation unit are based on a corrector ($C_t$, $C_p$) of instantaneous rate of rotation on each of said at least two axes (y) and (z) in the reference system of the equipment, which is applied to the inverse Jacobian matrix ($J^{-1}$) of the positioner and with feedback of measurements of equipment rates of rotation ($m_y$, $m_z$), said Jacobian matrix depending on angle measurements ($\theta_p$, $\theta_t$) of the encoders of the positioner, the correctors Cp and Ct of instantaneous rate of rotation of the intra-positioner servo control-correction means about the axes (y) (z) of the system to be positioned are synthesized by a conventional (PID) or sophisticated technique of servo-control calculation, the correctors Cp and Ct are synthesized according to a method chosen among, in particular, PID: "Proportional Integral Derivative", LQG: Linear Quadratic Gaussian control, H∞ (Hinfinite) or pole placement, the system further includes a pointing drift corrector, the time constant of which is high with respect to the time constants of the calculation loops of the intra-positioner servo control-correction means, the pointing drift corrector implements in the calculation means a "feedback" and "feedforward" calculation structure based on the estimated equipment attitude ($\bar{q}$) and acting on the command of instantaneous rate of rotation intended to the intra-positioner servo control-correction, the positioner is a turret including only two controlled axis-orientation means, a first one of the pan/horizontal type and a second one of the tilt/vertical type and two gyrometer sensors measuring the instantaneous rates of rotation about the axes y and z of the equipment to be used, the command of rate of rotation for the intra-positioner servo control-correction being about said two axes, the rate command $\omega_y^*$ $\omega_z^*$ compensating for the biases and thus for the pointing drift and intended to the intra-positioner servo control-correction means is calculated based on the command of instantaneous rate of rotation $\omega_y^r$, $\omega_z^r$ coming from a user and from the estimates of the biases $\hat{p}_y$, $\hat{p}_z$ by application of a control law corresponding to:

$$\begin{pmatrix} \omega_y^* \\ \omega_z^* \end{pmatrix} = \begin{pmatrix} -\hat{p}_y \\ -\hat{p}_z \end{pmatrix} - \frac{1}{Tc} \cdot M^T(\bar{q}) \cdot \begin{pmatrix} Z_1 - Z_1^r \\ Z_2 - Z_2^r \\ Z_2 - Z_3^r \end{pmatrix} + \begin{pmatrix} \omega_y^r \\ \omega_z^r \end{pmatrix}$$

where $Z_i^r$ i=1, 2, 3 are the coordinates of the pointing vector command in the terrestrial reference system, $Z_1$, $Z_2$, $Z_3$ are the coordinates of the pointing vector in the terrestrial reference system, $M^T$ is a matrix (2*3) whose elements are expressed based on the components of the estimated attitude quaternion $\bar{q}$ of the attitude of the equipment, Tc is an adjustment parameter, real, higher than 0, the positioner includes three gyrometer sensors arranged according to a trihedron, the positioner is a turret and includes only two controlled axis-orientation means, a first one of the pan/horizontal type and a second one of the tilt/vertical type and three gyrometer sensors in trihedron, the gyrometer sensors are placed the closest to the equipment to be stabilized, the positioner further includes an additional gyrometer sensor for the roll axis, placed on the x axis of the equipment to be stabilized, and producing measurements of equipment rate of roll rotation ($m_x$), the three gyrometer sensors being arranged according to a trihedron, and the equipment is an electronic imaging apparatus with image processing means, including at least image rotation processing, and the calculation means further allow correcting and controlling the rotation of the image so as to suppress the effect of vehicle roll based on the measurements of equipment rate of roll rotation ($m_x$) and on the equipment attitude estimation ($\bar{q}$), the positioner further includes a controlled motorization of axis orientation in roll-type rotation and a corresponding gyrometer sensor, and the calculation means further allow correcting or controlling said motorization of axis orientation in roll-type rotation, the positioner includes three motorized controlled axes, the positioner includes three motorized controlled axes that are following the pan (p)/horizontal (y), tilt (t)/vertical (z) and roll (x) axes, the positioner includes three controlled axis-orientation means, a first one of the pan/horizontal type, a second one of the tilt/vertical type and third one in roll (x), said roll orientation means including an angle encoder producing angle measurements ($\theta_r$) for said controlled axis, the positioner including three gyrometer sensors for said three axes and producing measurement of equipment rate of rotation ($m_y$, $m_z$, $m_x$), the three gyrometer sensors being arranged according to a trihedron, and the command of orientation is about said three axes, the command of orientation is limited to the two pan/horizontal and tilt/vertical axes, the command of orientation about the roll axis being a constant value, the equipment is an imaging apparatus, in particular a camera, the equipment includes an antenna, the equipment is a light source, in particular laser, the calculation unit ant the calculation means are distinct calculators, the calculation unit ant the calculation means are a single calculator, the calculation means are in the calculation unit, the calculation unit is a single calculator, the calculation unit results from the association of several calculators, the calculators of the calculation unit resulting from the association of several calculators are at different places, preferably, at least one of the calculators is in neighborhood relation with the positioner, said calculator in neighborhood relation with the positioner including the intra-positioner correction calculation means, the vehicle is a terrestrial vehicle, the vehicle is an airborne vehicle, the vehicle is a maritime vehicle.

A bias correction method and a pointing drift correction method, possible combined together, may also be considered within the framework of the invention.

More particularly, a method of stabilization of a motorized-axis equipment positioner is also contemplated, the positioner being oriented under the action of a command of orientation following a line of sight/pointing, said positioner being installed on a vehicle, the vehicle undergoing movements referred to as bearing movements, the equipment positioner including angle encoders producing angle measurements ($\theta_p$, $\theta_t$) for its controlled axes and a set of gyrometer sensors producing measurements of equipment instantaneous rates of rotation ($m_y$, $m_z$), said gyrometer sensors exhibiting biases ($p_y$, $p_z$), the positioner including gyrometer sensors for at least two axes (y) (z) of the equipment reference system, the positioner including a calculation unit with intra-positioner means for servo control-correction of the instantaneous rates of rotation of the equipment using measurements and the command of orientation to stabilize the equipment following the line of sight, a means for measuring the vehicle attitude giving measurements of attitude of the vehicle being installed in the vehicle. Calculation means are implemented to control the positioner according to a control law that allows correcting the biases ($\hat{p}_y$, $\hat{p}_z$) thanks to vehicle attitude information, and a state observer combining an equipment attitude estimation ($\bar{q}$) and the measurements of equipment rates of rotation ($m_y$, $m_z$) is implemented therein, in order to determine the biases of the gyrometer sensors of the positioner and to correct them within the control law, and the equipment attitude estimation ($\bar{q}$) is obtained by calculation in the calculation means based on the vehicle attitude measurements ($\Psi$, $\theta$, $\Phi$) and the angle measurements ($\theta_p$, $\theta_t$) of the controlled positioning axes of the positioner.

The method in question may be declined according to all the operational modalities, possibly combined together, of the system.

The invention finally relates to various applications, one of which consists in equipping a non-equipped vehicle with a positioner, a means for measuring the vehicle attitude and the calculation means, another one of which consists in equipping a vehicle pre-equipped with a positioner with a means for measuring the vehicle attitude and the calculation means, and still another one of which consists in equipping a vehicle pre-equipped with a positioner and a means for measuring the vehicle attitude with the calculation means.

More precisely, it is provided an application of the system of the invention for the implementation of the method of the invention, in which the vehicle is pre-equipped with a motorized-axes equipment positioner, the positioner being oriented under the action of a command of orientation following the line of sight/pointing, said positioner being installed on a vehicle, the vehicle undergoing movements referred to as bearing movements, the positioner including angle encoders producing angle measurements ($\theta_p$, $\theta_t$) for its controlled axes and a set of gyrometer sensors producing measurements instantaneous equipment rates of rotation ($m_y$, $m_z$), said gyrometer sensors exhibiting biases ($p_y$, $p_z$), the positioner including gyrometer sensors for at least two axes (y) (z) of the equipment reference system, the positioner including a calculation unit with intra-positioner means for servo control-correction of the instantaneous rates of rotation of the equipment using measurements and the command of orientation to stabilize the equipment following the line of sight, and the pre-equipped vehicle is equipped with a means for measuring the vehicle attitude, giving measurements of attitude of the vehicle, and with calculation means for controlling the positioner according to a control law that allows correcting the biases ($\hat{p}_y$, $\hat{p}_z$) thanks to vehicle attitude information and by implementing a state observer combining an equipment attitude estimation ($\bar{q}$) and the measurements of equipment rates of rotation ($m_y$, $m_z$), in order to determine the biases of the gyrometer sensors of the positioner and to correct them within the control law, the equipment attitude estimation ($\bar{q}$) being obtained by calculation in the calculation means of the system based on the vehicle attitude measurements ($\Psi$, $\theta$, $\Phi$) and the angle measurements ($\theta_p$, $\theta_t$) of the controlled positioning axes of the positioner.

More precisely, it is provided an application of the system of the invention for the implementation of the method of the invention, in which a vehicle non equipped with the system is equipped with:

a motorized-axis equipment positioner, the positioner being oriented under the action of a command of orientation following a line of sight/pointing, said positioner being installed on a vehicle, the vehicle undergoing movements referred to as bearing movements, the positioner including angle encoders producing angle measurements ($\theta_p$, $\theta_t$) for its controlled axes and a set of gyrometer sensors producing measurements of equipment instantaneous rates of rotation ($m_y$, $m_z$), said gyrometer sensors exhibiting biases ($p_y$, $p_z$), the positioner including gyrometer sensors for at least two axes (y) (z) of the equipment reference system, the positioner including a calculation unit with intra-positioner means for servo control-correction of the instantaneous rates of rotation of the equipment using measurements and the command of orientation for stabilizing the equipment following the line of sight, a means for measuring the vehicle attitude giving measurements of attitude of the vehicle, and calculation means for controlling the positioner according to a control law that allows correcting the bias ($\hat{p}_y$, $\hat{p}_z$) thanks to vehicle attitude information and by implementing a state observer combining an equipment attitude estimation ($\bar{q}$) and the measurements of equipment rates of rotation ($m_y$, $m_z$) so as to determine the biases of the gyrometer sensors of the positioner and to correct them within the control law, the equipment attitude estimation ($\bar{q}$) being obtained by calculation in the calculation means of the system, based on the vehicle attitude measurements ($\Psi$, $\theta$, $\Phi$) and the angle measurements ($\theta_p$, $\theta_t$) of the controlled positioning axes of the positioner.

BRIEF DESCRIPTION OF THE DRAWINGS

The present invention, without being limited thereby, will now be exemplified with the following description of embodiments and modes of implementation, in relations with.

DETAILED DESCRIPTION OF THE PREFERRED EMBODIMENTS

Figure 1:
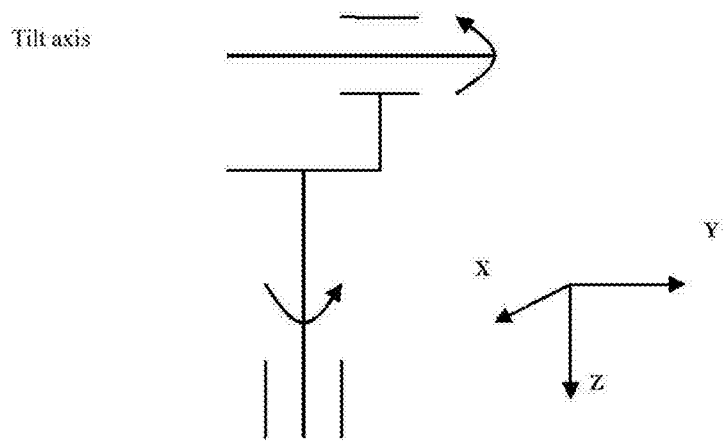
FIG. 1 that shows a structural scheme of a two-axis positioner.
Figure 2:
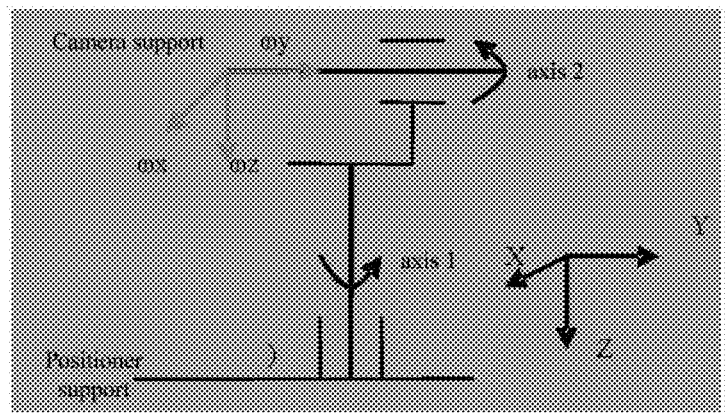
FIG. 2 that shows a scheme of the positioner with a reference system associated with an equipment, which is a camera, FIG. 3 that shows the local terrestrial reference system and the pointing vector, FIG. 4 that shows the control law of a first known method of stabilization, FIG. 5 that shows the control law of a second known method of stabilization, FIG. 6 that shows the principle of calculation of the estimation of the gyrometer biases, FIG. 7 that shows the structure of the control law of correction of the biases and of pointing drift of the gyrometers, and FIG. 8 that shows the structure of the control law of correction of the biases and of pointing drift of the gyrometers, with correction of the roll.
Figure 3:
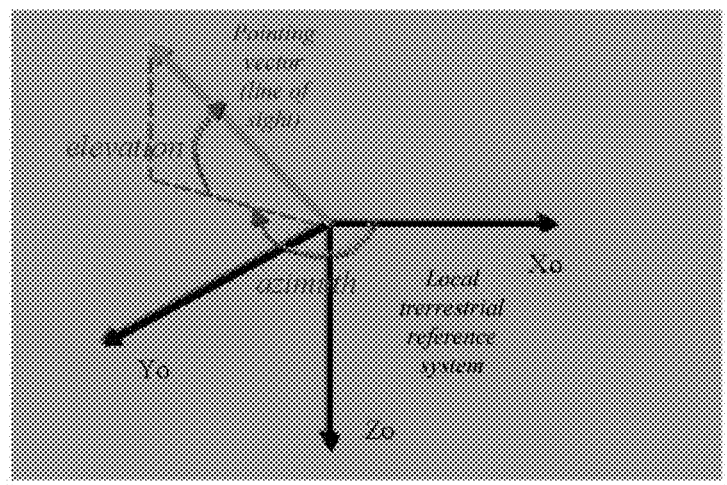
Figure 4:
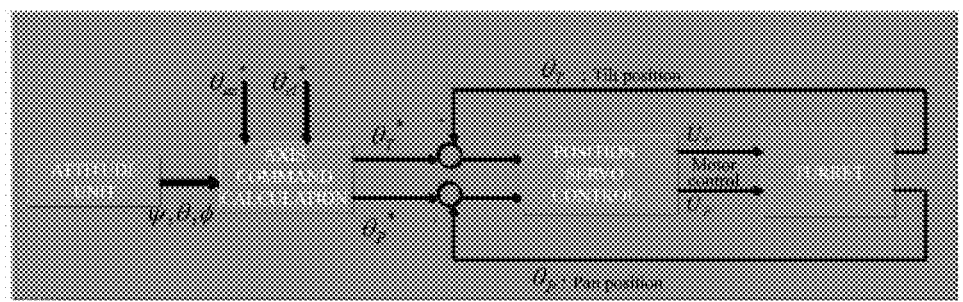
Figure 5:
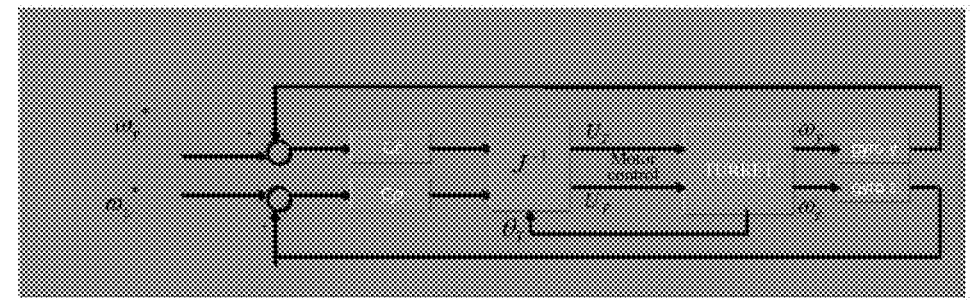
Figure 6:
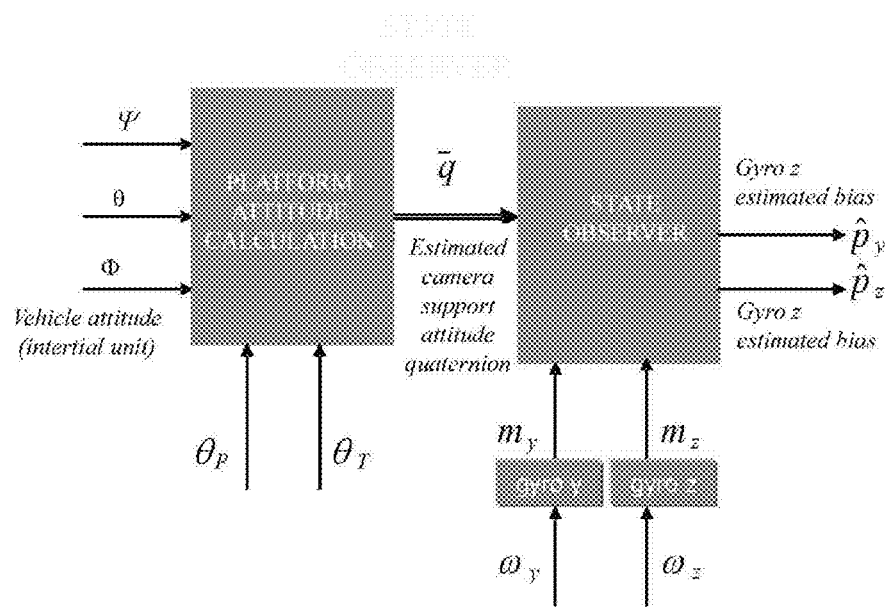

To simplify the explanations hereinafter, it will be considered essentially a platform or turret with two controlled axes, shown in FIG. 1: a first pan (p)/horizontal (y) axis and a second tilt(t)/vertical (z) axis, but it will be seen that the invention may be extended to three axes by adding thereto an axis allowing correcting the roll or an external software correction of the roll (rotation of the image). Likewise, the equipment considered for the explanations is an imaging apparatus or camera.

Basically, it is implemented in association with the second method, i.e. it is combined to a local, intra-positioner stabilizer. However, it will be seen that this local stabilizer does not intervene directly in the control law of the invention. In practice, the local, intra-positioner stabilizer is present and used because the invention has to implement gyrometers on the positioner and the presence of such gyrometers allows in any way the implementation of the local, intra-positioner stabilizer.

The principle at the basis of the invention consists in providing the turret with gyrometers, typically a trihedron of gyrometers, located at the closest of the camera, according to the principle of the second method presented hereinabove, but such gyrometers are chosen very low cost, for example by using gyrometers of MEMS types. These low-cost gyrometers thus exhibit high biases, typically of the order of 1°/s, which would make a gyro-stabilization by the second method very bad due to the great drifts resulting therefrom. The present invention allows correcting the effects of these gyrometers biases.

Besides the advantage in terms of cost, these gyrometers have a much reduced size and weight only a few grams.

These high-bias gyrometers are inserted in rate servo controls, allowing compensating very energetically for the bearing movements affecting the turret.

The correction of the effects of these gyrometer biases is obtained using the information of the vehicle attitude unit, which is combined with the information of the encoders of the turret so as to have an estimation of the camera attitude in the local terrestrial reference system.

The estimate of the camera attitude is fused with the gyrometer measurements by means of a state observer, which may be a Kalman filter, so as to estimate the bias of the gyrometers.

Such estimated biases are then subtracted from the measurements of the gyrometers in the rate servo controls.

Thanks to the invention, it is possible to compensate in great part for the biases of the low-cost gyrometers, while having the advantage of a very nervous rate servo control made by means of sensors located at the closest of the camera.

Figure 7:
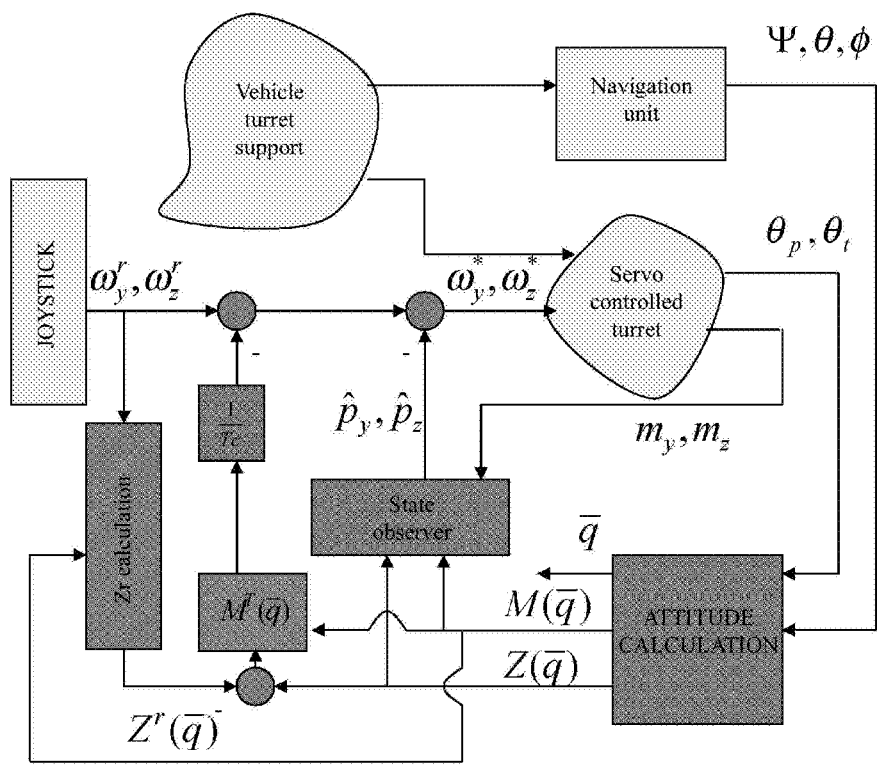

The estimation of the biases of the gyrometers of the positioner is based on the following method, schematized in FIG. 7:

Let's consider:

$M_y$ gyrometer measurement of the rotation $\omega_y$,
$m_z$ gyrometer measurement of the rotation $\omega_z$
$p_y$ gyrometer bias y
$p_z$ gyrometer bias z
$\hat{p}_y$ estimation of the gyrometer bias y
$\hat{p}_z$ estimation of the gyrometer bias z Let q be the attitude quaternion of the camera with respect to the terrestrial reference system,
let $q_1$ be the attitude quaternion of the vehicle with respect to the terrestrial reference system,
let $q_2$ be the attitude quaternion of the camera with respect to the vehicle reference system, and
$\bar{q}$, $\bar{q}_1\bar{q}_2$ the estimates of these quaternions by means of the measurements of the attitude unit and of the encoders.

The calculation of the attitude quaternion q of the camera support is made by the product of the quaternion of the vehicle attitude with respect to the terrestrial reference system by the quaternion of the camera support attitude with respect to the vehicle.

Let's consider:

$$q_1 = \begin{pmatrix} a_1 \\ b_1 \\ c_1 \\ d_1 \end{pmatrix} \quad q_2 = \begin{pmatrix} a_2 \\ b_2 \\ c_2 \\ d_2 \end{pmatrix}$$

It is shown that $q_1$ may be expressed by means of the yaw, pitch and roll angles of the vehicle (conventional relation):

$$a_1 = \cos\frac{\phi}{2}\cos\frac{\theta}{2}\cos\frac{\psi}{2} + \sin\frac{\phi}{2}\sin\frac{\theta}{2}\sin\frac{\psi}{2} \quad (8)$$

$$b_1 = \sin\frac{\phi}{2}\cos\frac{\theta}{2}\cos\frac{\psi}{2} - \cos\frac{\phi}{2}\sin\frac{\theta}{2}\sin\frac{\psi}{2}$$

$$c_1 = \cos\frac{\phi}{2}\sin\frac{\theta}{2}\cos\frac{\psi}{2} + \sin\frac{\phi}{2}\cos\frac{\theta}{2}\sin\frac{\psi}{2}$$

$$d_1 = \cos\frac{\phi}{2}\cos\frac{\theta}{2}\sin\frac{\psi}{2} - \sin\frac{\phi}{2}\sin\frac{\theta}{2}\cos\frac{\psi}{2}$$

Besides, $q_2$ may also be expressed by means of $\theta_P$ et $\theta_T$ according to the relations:

$$a_2 = \cos\frac{\theta_T}{2}\cos\frac{\theta_P}{2} + \sin\frac{\theta_T}{2}\sin\frac{\theta_P}{2} \quad (9)$$

$$b_2 = \cos\frac{\theta_T}{2}\cos\frac{\theta_P}{2} - \sin\frac{\theta_T}{2}\sin\frac{\theta_P}{2}$$

$$c_2 = \sin\frac{\theta_T}{2}\cos\frac{\theta_P}{2} + \cos\frac{\theta_T}{2}\sin\frac{\theta_P}{2}$$

$$d_2 = \cos\frac{\theta_T}{2}\sin\frac{\theta_P}{2} - \sin\frac{\theta_T}{2}\cos\frac{\theta_P}{2}$$

The attitude quaternion q of the camera support with respect to the terrestrial reference system is expressed by: $q=q_1 \cdot q_2$, i.e.: (quaternion product)

$$q = \begin{pmatrix} a \\ b \\ c \\ d \end{pmatrix} = \begin{pmatrix} a_2 & -b_2 & -c_2 & -d_2 \\ b_2 & a_2 & -d_2 & c_2 \\ c_2 & d_2 & a_2 & -b_2 \\ d_2 & -c_2 & b_2 & a_2 \end{pmatrix} \cdot \begin{pmatrix} a_1 \\ b_1 \\ c_1 \\ d_1 \end{pmatrix} \quad (10)$$

Likewise, $\hat{q}$ is deduced from the measurements $\bar{q}_1\bar{q}_2$, because:

$$\bar{q} = \bar{q}_1 \cdot \bar{q}_2 \quad (11)$$

At the platform supporting the camera, the conventional equation of propagation of the quaternions is written:

$$\begin{pmatrix} \dot{a} \\ \dot{b} \\ \dot{c} \\ \dot{d} \end{pmatrix} = 0.5 \begin{pmatrix} a & -b & -c & -d \\ b & a & -d & c \\ c & d & a & -b \\ d & -c & b & a \end{pmatrix} \cdot \begin{pmatrix} 0 \\ \omega_x \\ \omega_y \\ \omega_z \end{pmatrix} \quad (12)$$

Moreover, we have the measurements of the gyrometers on the axes Y, Z (possibly X) in the reference system of the camera. These measurements are written, by definition:

$$\begin{pmatrix} m_y \\ m_z \end{pmatrix} = \begin{pmatrix} \omega_y + p_y \\ \omega_z + p_z \end{pmatrix} \quad (13)$$

The object of the gyro-stabilization is to keep $\theta_{el}$ $\theta_{az}$ constant at a command value: $\theta_{el}^*$ $\theta_{az}^*$.

Keeping $\theta_{el}$ $\theta_{az}$ constant comes to keep constant the pointing vector of the camera, that is called Z, expressed in the terrestrial reference system.

It is to be noted that this vector Z is normalized to the unit because it is written:

$$Z = \begin{pmatrix} \cos(\theta_{el}) \cdot \cos(\theta_{az}) \\ \cos(\theta_{el}) \cdot \sin(\theta_{az}) \\ -\sin(\theta_{el}) \end{pmatrix} \quad (14)$$

This pointing vector may also be written as a function of the components of the quaternion q. Using the relation (4), it can be obtained $$Z = \begin{pmatrix} a^2 + b^2 + c^2 + d^2 \\ 2(bc + ad) \\ 2(bd - ac) \end{pmatrix} = \begin{pmatrix} Z_1 \\ Z_2 \\ Z_3 \end{pmatrix} \quad (15)$$

By derivation of the expression (15) combined to the relation (12), it is found, any calculations done:

$$\begin{pmatrix} \dot{Z}_1 \\ \dot{Z}_2 \\ \dot{Z}_3 \end{pmatrix} = \begin{pmatrix} -2(bd + ac) & 2(bc - ad) \\ -2(cd - ab) & (a^2 - b^2 + c^2 - d^2) \\ -(a^2 - b^2 - c^2 + d^2) & 2(cd + ab) \end{pmatrix} \cdot \begin{pmatrix} \omega_y \\ \omega_z \end{pmatrix} \quad (16)$$

Let's consider:

$$M(q) = \begin{pmatrix} -2(bd+ac) & 2(bc-ad) \\ -2(cd-ab) & (a^2-b^2+c^2-d^2) \\ -(a^2-b^2-c^2+d^2) & 2(cd+ab) \end{pmatrix} \quad (17)$$

It is observed that the pseudo-inverse $M^+(q)$ of $M(q)$ is equal to the transpose of this matrix $M(q)$, i.e.:

$$M^+(q) = M^T(q) \quad (18)$$

$$M^T(q) \cdot M(q) = I_{2,2} \quad (19)$$

We have an estimation of q, noted $\bar{q}$, which comes from the measurements performed by the attitude unit and the encoders. Taking into account the distance of the unit, this estimation is marred with errors. On the other hand, there is no strictly speaking drift on this measurement. This is why it can be combined with the measurements of the gyrometers in order to estimate the biases of these latter.

The estimation of the biases $p_y$, $p_z$ of the gyrometers can be made by means of a state observer.

For that purpose, a constant predictive model is defined for each of these two biases, i.e.:

$$\dot{p}_y = 0$$

$$\dot{p}_z = 0 \quad (20)$$

An increased model of the system is then synthesized so as to construct a state observer. Let X be the state vector of the increased system:

$$X = \begin{pmatrix} Z_1 \\ Z_2 \\ Z_3 \\ p_y \\ p_z \end{pmatrix} \quad (21)$$

The state equation of the increased system is then written:

$$\dot{X} = \begin{bmatrix} 0_{3,3} & M(q) \\ 0_{2,3} & 0_{2,2} \end{bmatrix} \cdot X + \begin{pmatrix} M(q) \\ 0_{2,2} \end{pmatrix} \cdot \begin{pmatrix} \omega_y \\ \omega_z \end{pmatrix} \quad (23)$$

This model can be considered as being of the unsteady linear type because M depends on q, which itself depends on time. The observer is synthesized by replacing q by $\bar{q}$, and by taking as hypothesis that the rate servo controls based on the gyrometers are infinitely stiff, i.e. $\omega_y^* = \omega_y$ and $\omega_z^* = \omega_z$. This hypothesis of infinite stiffness of the rate servo controls is perfectly justified, since the dynamics of the observer is far slower than that of the gyrometer loops.

Let $\hat{X}$ be the estimated state vector of X, the following state equation of the observer is then written:

$$\hat{X} = \begin{bmatrix} 0_{3,3} & M(\bar{q}) \\ 0_{2,3} & 0_{2,2} \end{bmatrix} \cdot \hat{X} + \begin{pmatrix} M(\bar{q}) \\ 0_{2,2} \end{pmatrix} \cdot \begin{pmatrix} \omega_y^* \\ \omega_z^* \end{pmatrix} \quad (24)$$

The observation equation being:

$$\bar{Z} = [I_{3,3} \, 0_{3,2}] \cdot \hat{X} \quad (25)$$

Several observers may be used for this model. In particular, an unsteady Kalman filter may be used, which is just one of several possibilities, including for example an observer using the digital derivatives of the signals.

By writing:

$$A(t) = \begin{bmatrix} 0_{3,3} & M(\bar{q}(t)) \\ 0_{2,3} & 0_{2,2} \end{bmatrix} \quad B(t) = \begin{pmatrix} M(\bar{q}(t)) \\ 0_{2,2} \end{pmatrix} \quad C = [I_{3,3} \, 0_{3,2}] \quad (26)$$

the conventional equations of the Kalman filter are written $$\hat{X} = A(t) \cdot \hat{X} + B(t) \cdot \begin{pmatrix} \omega_y^* \\ \omega_z^* \end{pmatrix} + Ko(t) \cdot (\bar{Z} - C \cdot \hat{X}) \quad (27)$$

$$Ko(t) = Po(t) \cdot C^T \cdot R_0^{-1}$$

$$P_o = A(t) \cdot Po + Po \cdot A^T + Q_o - P_o \cdot C^T \cdot R_0^{-1} \cdot C \cdot P_0$$

with $Q_0$, $R_0$ covariance matrices of the state and output noises
$P_0$ covariance matrix of the estimation errors
$Ko(t)$ gain of the Kalman filter.

It is to be noted that the matrices that $Q_0$, $R_0$ that constitute the filter adjustment parameters have not their coefficients chosen as a function of static considerations.

For the adjustment of the Kalman filter, we consider the dynamics of estimation of the bias values. This dynamics should be slow with respect to that of the bearing movements. Once the biases estimated, they are introduced in the control law, which then becomes:

$$\begin{pmatrix} \omega_y^* \\ \omega_z^* \end{pmatrix} = \begin{pmatrix} \omega_y^r - \hat{p}_y \\ \omega_z^r - \hat{p}_z \end{pmatrix} \quad (28)$$

where $\omega_y^r$, $\omega_x^r$ are the external commands coming for example from a joystick operated by the user of the camera. A schematic representation of the previous estimation of the biases is shown in FIG. 7.

The control law (28) thus compensate for the disturbances due to the gyrometer biases, i.e. it makes $\omega_y$ tend asymptotically toward $\omega_y^r$ and $\omega_z$ toward $\omega_z$ but it does not stabilize Z. So it is preferable to further operate a feedback stabilization, i.e. by return of state information. The feedback stabilization law must, for example, result in:

$$\begin{pmatrix} \dot{Z}_1 \\ \dot{Z}_2 \\ \dot{Z}_3 \end{pmatrix} = \frac{-1}{Tc} \cdot \begin{pmatrix} Z_1 - Z_1^r \\ Z_{21} - Z_2^r \\ Z_2 - Z_3^r \end{pmatrix} \quad (29)$$

where:

Tc is an adjustment parameter whose unit is the second, and $$\begin{pmatrix} Z_1^r \\ Z_2^r \\ Z_3^r \end{pmatrix}$$

is an external command of the normalized pointing vector.

Taking into account the equations (16), (17), (18) and (28), the control law is then written:

$$\begin{pmatrix} \omega_y^* \\ \omega_z^* \end{pmatrix} = \begin{pmatrix} -\hat{p}_y \\ -\hat{p}_z \end{pmatrix} - \frac{1}{Tc} \cdot M^T(\overline{q}) \cdot \begin{pmatrix} Z_1 - Z_1^r \\ Z_{21} - Z_2^r \\ Z_2 - Z_3^r \end{pmatrix} \quad (30)$$

In practice, the turret is operated by the user by means of a joystick, which gives rate commands.
As a consequence, $$\begin{pmatrix} Z_1^r \\ Z_2^r \\ Z_3^r \end{pmatrix}$$

must be expressed as a function of $\omega_y^r$, $\omega_z^r$, which is done by considering the equations (16), (17), (18), i.e.:

$$\begin{pmatrix} \dot{Z}_1^r \\ \dot{Z}_2^r \\ \dot{Z}_3^r \end{pmatrix} = M(\overline{q}) \cdot \begin{pmatrix} \omega_y^r \\ \omega_z^r \end{pmatrix} \quad (31)$$

Besides, Tc, which has the dimension of a time, is intended to be very high with respect to the main time constant of the angular rate servo control loops including the gyrometers, precisely in order not to interfere with this loop.
It is then necessary to add a direct or feedforward action to this control law, which becomes:

$$\begin{pmatrix} \omega_y^* \\ \omega_z^* \end{pmatrix} = \begin{pmatrix} -\hat{p}_y \\ -\hat{p}_z \end{pmatrix} - \frac{1}{Tc} \cdot M^T(\overline{q}) \cdot \begin{pmatrix} Z_1 - Z_1^r \\ Z_2 - Z_2^r \\ Z_2 - Z_3^r \end{pmatrix} + \begin{pmatrix} \omega_y^r \\ \omega_z^r \end{pmatrix} \quad (32)$$

The thus-synthesized control law, which is shown in FIG. 7, thus allows estimating the gyrometer biases so as to compensate for them at the angular rate loops, where are precisely included these gyrometers. The feedforward-feedback unit allows following the command of the pointing vector given by the user.

This stabilizing law has a dynamics far slower than the rate loops of the gyrometers. The use of the term "feedback" is optional if a slight drift of the pointing vector over the long term is tolerated.

Therefore, this control law is based on an estimation $\overline{q}$ of the camera attitude, which comes from the combined measurements of the vehicle attitude unit and of the encoders. This estimated attitude is marred with errors, which does not matter provided that there is no drift in the error on the attitude measured by the vehicle attitude unit, which is the case in practice given the high performances of this type of attitude unit, in particular in the case where the vehicle is pre-equipped with such a unit.

This control law thus allows obtaining very good gyro-stabilization performances on a turret, the residual drifts due to the biases can be reduced by a factor 20 or even 50, with a minimum of sensors, of very low cost.

The above-described control law allows stabilizing the line of sight of the camera. On the other hand, since the turret includes only two axes, it is not possible to stabilize mechanically the roll of said camera.

The joint use of the measurement of instantaneous rate of the camera following its axis X combined with the information of the vehicle navigation unit and the encoders of the turret allows estimating this angle of roll.

Once estimated, this information about the angle of roll allows operating a processing of the image perceived by the camera, in order to subject it to a rotation opposed to that of the estimated angle of roll.

Let's consider:
$m_x$ the measurement of the rotation $\omega_x$
$p_x$ the bias of the gyrometer following the axis x.
Then:

$$m_x = p_x + \omega_x$$

The roll $\overline{\phi}_c$ is directly deduced from the information of the encoders and the vehicle unit, based on the quaternion $\overline{q}$, according to the conventional relation:

$$\overline{\phi}_c = \arctan\left(\frac{2(\overline{c}\overline{d} + \overline{a}\overline{b})}{(\overline{a}^2 - \overline{b}^2 - \overline{c}^2 + \overline{d}^2)}\right) \quad (33)$$

$\overline{a}, \overline{b}, \overline{c}, \overline{d}$ being the components of $\overline{q}$.
Furthermore, $\omega_x$ is directly the derivative of the roll $\phi_c$.
By assigning a constant predictive model to the bias $p_x$, a synthesis model can be constructed, on which will be based a state observer intended to estimate the roll.
Said synthesis model has the following form:

$$\dot{p}_x = 0$$

$$\dot{\phi}_c = m_x - p_x \quad (34)$$

The roll state observer is written:

$$\hat{\dot{p}}_x = K_1 \cdot (\overline{\phi}_c - \hat{\phi}_c)$$

$$\hat{\dot{\phi}}_c = m_x - \hat{p}_x + K_2 \cdot (\overline{\phi}_c - \hat{\phi}_c) \quad (35)$$

The variables topped with a circumflex accent (∧) being the estimates, and $K_1$, $K_2$ being the gains of the observer that can be adjusted, for example, by pole placement or by an optimization of the "Kalman" type.

The roll being estimated, it is then possible to transmit this value to an image processing device associated with the camera in order to subject this image to a rotation of angle $-\hat{\phi}_c$.

Figure 8:
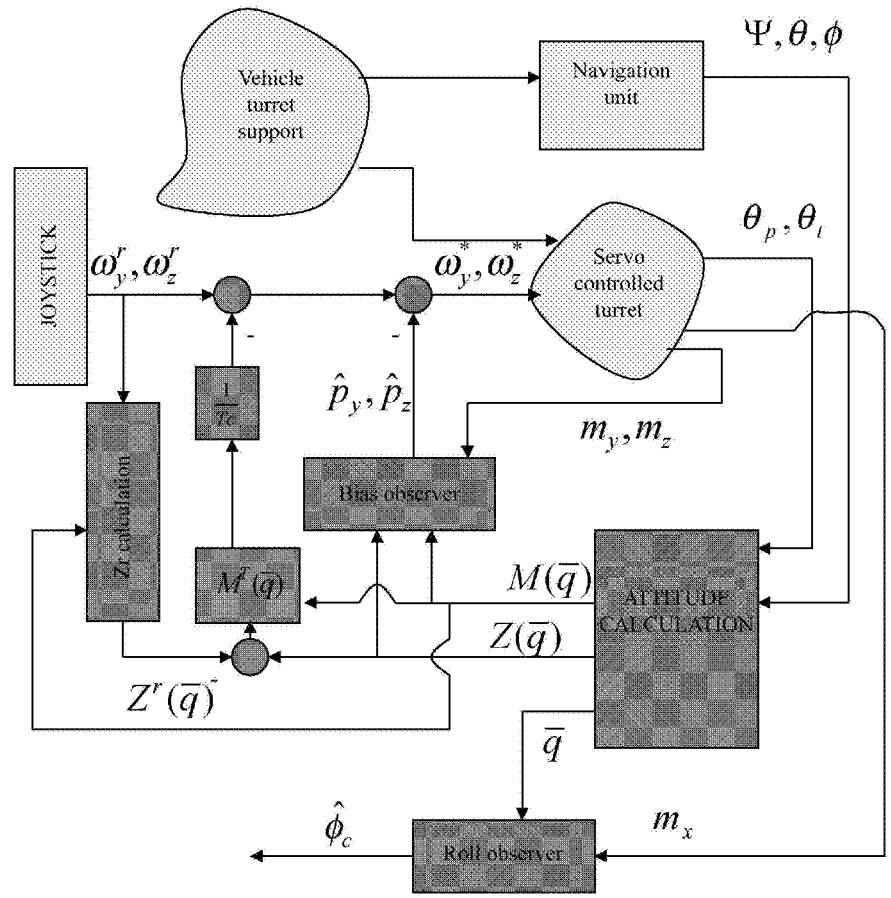

FIG. 8 shows a representation of the structure of the control law in its environment of application in the case where the roll has also to be corrected.

This roll correction uses the possibility rotating the images of the camera and is thus software-based, but the roll correction may also be physical in the case where an additional motorized controlled axis is implemented to rotate the equipment. In this case, in the intra-positioner servo control-correction means, there is additionally an intra-positioner loop controlling the rotation rate $\omega_x$, by means of the measurement $m_x$. The command for the roll in the control law is then:

$$\omega_x^* = \frac{1}{Tcx} \cdot (\phi_c^* - \overline{\phi}_c) - \hat{p}_x$$

where Tcx is an adjustment parameter whose unit is that of a time.

Generally, the system of the invention may be considered as allowing the implementation of a non-linear control law by return of reconstructed state information, which is an external control law including an intra-positioner control law, the latter being the internal control law.

One interest of the system of the invention is that the intra-positioner control law may exist before the external control law and this allows, in particular applications, to use previously fabricated positioners, devoid of bias compensating system, by adding thereto means for implementing the external law of the invention without any resulting drawback. On the economical point of view, this modularity of the control laws is very appreciable, because it allows providing old gyro-stabilized positioners with a drift compensation system, without modifying the existing structure.

It can be noted that this characteristics differentiates the present invention from the method disclosed in the abovementioned document GB2345155A, in which the internal loop, which moreover is a position loop, is inevitably interleaved with the Kalman filter, because a direct measurement of the encoders cannot be substituted to the corrected angular estimates of the Cardan joint. On the contrary, in the present invention, a step of calculation of attitude of the positioner is implemented based on the raw measurements of the gyroscopic unit of the vehicle and on the angle measurements of the positioner. The result of this calculation coming from raw measurements and thus marred with some errors is then used by the state observer. Indeed, it is reminded that, in the present invention, the estimate of the positioner attitude is fused with the gyrometer measurements by means of a state observer that may be a Kalman filter, so as to estimate the gyrometer bias. The equipment attitude estimation $\bar{q}$ is obtained by calculation in the calculation means of the system, directly based on the vehicle attitude measurements ($\Psi$, $\theta$, $\Phi$) and the angle measurements ($\theta_p$, $\theta_t$) of the controlled positioning axes of the positioner.

No step of calculation of the attitude of the mirrors is performed in the method of GB2345155A, the corrected and integrated measurements and data of the sensors are directly processed by the Kalman filter. It may also be noted concerning this matter that, for an axis having a given transfer function, a rate loop as implemented in the present invention may still be more effective than a position loop as regards the bandwidth and the disturbance rejection dynamics.

Therefore, the system of the invention may be contemplated as allowing the implementation of an additive control law for a positioner servo controlled with gyrometers, aiming to increase the stabilization performances of said positioners. And it allows solving the question of updating of old systems, without any resulting drawback for the existing system.

Of course, the present invention is not limited to the particular embodiments that have been described, in particular variants exist in the mathematical expression of the problem and in the way to find a solution and it thus extends to any variants and equivalents within the sprit thereof. Therefore, it is well understood that the invention may be declined according to many other possibilities without thereby departing from the scope defined by the description and the claims.

The invention claimed is:

1. A stabilization system for an equipment positioner with motorized axes, the positioner being oriented under the action of a command of orientation following a line of sight/pointing, said positioner being installed on a vehicle, the vehicle undergoing movements referred to as bearing movements, the positioner including angle encoders producing angle measurements ($\theta_p$, $\theta_t$) for said axes and a set of gyrometer sensors producing measurements of equipment instantaneous rates of rotation ($m_y$, $m_z$), said gyrometer sensors exhibiting biases ($p_y$, $p_z$), the positioner including gyrometer sensors for at least two axes (y) (z) of the equipment reference system, the positioner including a calculation unit with intra-positioner means for servo control-correction of the instantaneous rates of rotation of the equipment using measurements and the command of orientation for stabilizing the equipment following the line of sight, the system configured to be installed in the vehicle where the vehicle includes a means for measuring the vehicle attitude, giving measurements of attitude of the vehicle, wherein the system includes:
calculation means for controlling the positioner according to a control law that allows correcting the bias ($\hat{p}_y$, $\hat{p}_z$) thanks to vehicle attitude information and by implementing a state observer combining an equipment attitude estimation ($\bar{q}$) and the measurements of equipment rates of rotation ($m_y$, $m_z$) so as to determine the biases of the gyrometer sensors of the positioner and to correct them within the control law, the equipment attitude estimation ($\bar{q}$) being obtained by calculation in the calculation means of the system, directly based on the vehicle attitude measurements ($\psi$, $\theta$, $\Phi$) and the angle measurements ($\theta_p$, $\theta_t$) of the controlled positioning axes of the positioner, and
a pointing drift corrector, within the calculation means, the time constant of which is high with respect to the time constant of the calculation loops of the intra-positioner servo control-correction means, and
wherein the command of orientation is expressed by means of a command of instantaneous rate of rotation, and the pointing drift corrector implements a feedback and feedforward calculation structure based on the estimated equipment structure ($\bar{q}$) and acting on the command of instantaneous rate of rotation intended to the intra-positioner servo control-correction.

2. The system according to claim 1, wherein the command of orientation is a command of instantaneous rate of rotation, and the intra-positioner servo control-correction means of the calculation unit are based on a corrector of instantaneous rate of rotation (Ct, Cp) on each of said at least two axes (y) and (z) in the equipment reference system, which is applied to the inverse Jacobian matrix ($J^{-1}$) of the positioner and with feedback of measurements of equipment rates of rotation ($m_y$, $m_z$) said Jacobian matrix depending on angle measurements ($\theta_r$, $\theta_t$) of the encoders of the positioner.

3. The system according to claim 2, wherein the correctors Cp and Ct of instantaneous rate of rotation of the intra-positioner servo control-correction means following the axes (y) (z) of the system to be positioned are synthesized by a technique of servo control calculation, which may be conventional or sophisticated.

4. The system according to claim 3, configured for a positioner that is a turret comprising only two controlled axis-orientation means, a first one of the pan/horizontal type and a second one of the tilt/vertical type, and two gyrometer sensors measuring the instantaneous rates of rotation about the axes y and z of the equipment to be stabilized, the command of rate of rotation for the intra-positioner servo control-correction being around said two axes.

5. The system according to claim 2, configured for a positioner that is a turret comprising only two controlled axis-orientation means, a first one of the pan/horizontal type and a second one of the tilt/vertical type, and two gyrometer sensors measuring the instantaneous rates of rotation about the axes y and z of the equipment to be stabilized, the command of rate of rotation for the intra-positioner servo control-correction being around said two axes.

6. The system according to claim 1, configured for a positioner that is a turret comprising only two controlled axis-orientation means, a first one of the pan/horizontal type and a second one of the tilt/vertical type, and two gyrometer sensors measuring the instantaneous rates of rotation about the axes y and z of the equipment to be stabilized, the command of rate of rotation for the intra-positioner servo control-correction being around said two axes.

7. The system according to claim 6, wherein the rate command $\omega^*_y, \omega^*_z$ compensating for the biases and thus for the pointing drift and intended to the intra-positioner servo control-correction means is calculated based on the command of instantaneous rate of rotation $\omega_y^r \omega_z^r$ coming from a user and on the bias estimates $\hat{p}_y, \hat{p}_z$ by application of a control law corresponding to:

$$\begin{pmatrix} \omega^*_y \\ \omega^*_z \end{pmatrix} = \begin{pmatrix} -\hat{p}_y \\ -\hat{p}_z \end{pmatrix} - \frac{1}{Tc} \cdot M^T(\overline{q}) \cdot \begin{pmatrix} Z_1 - Z_1^r \\ Z_2 - Z_2^r \\ Z_2 - Z_3^r \end{pmatrix} + \begin{pmatrix} \omega_y^r \\ \omega_z^r \end{pmatrix}$$

where
$Z_i^r$=1, 2, 3 are the coordinates of the pointing vector command in the terrestrial reference system,
$Z_1, Z_2, Z_3$ are the coordinates of the pointing vector in the terrestrial reference system,
$M^T$ is a matrix (2*3) whose elements are expressed based on the components of the estimated attitude quaternion $\overline{q}$ of the attitude of the equipment, and
Tc is an adjustment parameter, real, higher than 0.

8. The system according to claim 1, configured for an equipment that is an imaging apparatus.

9. The system according to claim 8, configured for a positioner further including an additional gyrometer sensor for the roll axis, producing measurements of equipment rate of roll rotation ($m_x$), the three gyrometer sensors being arranged according to a trihedron, and in that the equipment is an electronic imaging apparatus with image processing means, including at least image rotation processing, and in that the calculation means of the system further allow correcting and controlling the rotation of the image so as to suppress the effect of vehicle roll based on the measurements of equipment rate of roll rotation ($m_y$) and on the equipment attitude estimation ($\overline{q}$).

10. The system according to claim 1, configured for a positioner including three controlled axis-orientation means, a first one of the pan/horizontal type, a second one of the tilt/vertical type and third one in roll (x), said roll orientation means including an angle encoder producing angle measurements ($\theta_r$) for said control axis, the positioner including three gyrometer sensors for said three axes and producing measurements of equipment rate of rotation ($m_y, m_x, m_x$), the three gyrometer sensors being arranged according to a trihedron, and in that the command of orientation is about said three axes.

11. An application of the system of claim 1, in which the vehicle is pre-equipped with a motorized-axis positioner of equipment, the positioner being oriented under the action of a command of orientation following a line of sight/pointing, said positioner being installed on a vehicle, the vehicle undergoing movements referred to as bearing movements, the positioner including angle encoders producing angle measurements ($\theta_p, \theta_t$) for said axes and a set of gyrometer sensors producing measurements of equipment instantaneous rates of rotation ($m_y, m_z$), said gyrometer sensors exhibiting biases ($p_y, p_z$), the positioner including gyrometer sensors for at least two axes (y) (z) of the equipment reference system, the positioner including a calculation unit with intra-positioner means for servo control-correction of the instantaneous rates of rotation of the equipment using measurements and the command of orientation for stabilizing the equipment following the line of sight, wherein the pre-equipped vehicle is equipped with a means for measuring the vehicle attitude, giving measurements of attitude of the vehicle, and with calculation means for controlling the positioner according to a control law that allows correcting the bias ($\hat{p}_y, \hat{p}_z$) thanks to vehicle attitude information and by implementing a state observer combining an equipment attitude estimation ($\overline{q}$) and the measurements of equipment rates of rotation ($m_y, m_z$) so as to determine the biases of the gyrometer sensors of the positioner and to correct them within the control law, the equipment attitude estimation ($\hat{q}$) being obtained by calculation in the calculation means of the system, based on the vehicle attitude measurements ($\psi, \propto, \Phi$) and the angle measurements ($\theta_p, \theta_t$) of the controlled positioning axes of the positioner, wherein said calculation means includes therein a pointing drift corrector, the time constant of which is high with respect to the time constant of the calculation loops of the intra-positioner servo control-correction means, and wherein the command of orientation is expressed by means of a command of instantaneous rate of rotation, and the pointing drift corrector implements a feedback and feedforward calculation structure based on the estimated equipment structure ($\overline{q}$) and acting on the command of instantaneous rate of rotation intended to the intra-positioner servo control-correction.

12. The application of the system of claim 1, in which a vehicle non equipped with the system is equipped with:
a motorized-axis equipment positioner, the positioner being oriented under the action of a command of orientation following a line of sight/pointing, said positioner being installed on a vehicle, the vehicle undergoing movements referred to as bearing movements, the positioner including angle encoders producing angle measurements ($\theta_p, \theta_t$) for said axes and a set of gyrometer sensors producing measurements of equipment instantaneous rates of rotation ($m_y, m_z$), said gyrometer sensors exhibiting biases ($p_y, p_z$), the positioner including gyrometer sensors for at least two axes (y) (z) of the equipment reference system, the positioner including a calculation unit with intra-positioner means for servo control-correction of the instantaneous rates of rotation of the equipment using measurements and the command of orientation for stabilizing the equipment following the line of sight,
a means for measuring the vehicle attitude, giving measurements of attitude of the vehicle, and
calculation means for controlling the positioner according to a control law that allows correcting the bias ($\hat{p}_y, \hat{p}_z$) thanks to vehicle attitude information and by implementing a state observer combining an equipment attitude estimation ($\overline{q}$) and the measurements of equipment rates of rotation ($m_y$, $m_z$) so as to determine the biases of the gyrometer sensors of the positioner and to correct them within the control law, the equipment attitude estimation ($\bar{q}$) being obtained by calculation in the calculation means of the system, based on the vehicle attitude measurements ($\psi$, $\theta$, $\Phi$) and the angle measurements ($\theta_p$, $\theta_t$) of the controlled positioning axes of the positioner, wherein said calculation means including therein a pointing drift corrector, the time constant of which is high with respect to the time constant of the calculation loops of the intra-positioner servo control-correction means, and wherein the command of orientation is expressed by means of a command of instantaneous rate of rotation, and the pointing drift corrector implements a feedback and feedforward calculation structure based on the estimated equipment structure ($\bar{q}$) and acting on the command of instantaneous rate of rotation intended to the intra-positioner servo control-correction.

13. A method of stabilization of a motorized-axis equipment positioner, the positioner being oriented under the action of a command of orientation following a line of sight/pointing, said positioner being installed on a vehicle, the vehicle undergoing movements referred to as bearing movements, the equipment positioner including angle encoders producing angle measurements ($\theta_r$, $\theta_t$) for said axes and a set of gyrometer sensors producing measurements of equipment instantaneous rates of rotation ($m_y$, $m_z$), said gyrometer sensors exhibiting biases ($p_y$, $p_z$), the positioner including gyrometer sensors for at least two axes (y) (z) of the equipment reference system, the positioner including a calculation unit with intra-positioner means for servo control-correction of the instantaneous rates of rotation of the equipment using measurements and the command of orientation to stabilize the equipment following the line of sight, a means for measuring the vehicle attitude, giving measurements of attitude of the vehicle, wherein calculation means are implemented to control the positioner according to a control law that allows correcting the biases ($\hat{p}_y$, $\hat{p}_z$) thanks to vehicle attitude information and in that a state observer combining an equipment attitude estimation ($\bar{q}$) and the measurements of equipment rates of rotation ($m_y$, $m_z$) is implemented therein, in order to determine the biases of the gyrometer sensors of the positioner and to correct them within the control law, and in that the equipment attitude estimation ($\bar{q}$) is obtained by calculation in the calculation means directly based on the vehicle attitude measurements ($\psi$, $\theta$, $\Phi$) and the angle measurements ($\theta_p$, $\theta_t$) of the controlled positioning axes of the positioner, wherein said calculation means has further implemented therein a pointing drift corrector, the time constant of which is high with respect to the time constant of the calculation loops of the intra-positioner servo control-correction means, and wherein a command of instantaneous rate of rotation expresses the command of orientation, it being implemented in the pointing drift corrector a feedback and feedforward calculation structure based on the equipment attitude estimation ($\bar{q}$) and acting on the command of instantaneous rate of rotation intended to the intra-positioner servo control-correction.

* * * * *